United States Patent
Gerstenberger et al.

[11] Patent Number: 6,144,038
[45] Date of Patent: Nov. 7, 2000

[54] METHOD AND DEVICE FOR DETECTING THE POSITION OF STACKED MATERIAL

[75] Inventors: Markus Gerstenberger, Heidelberg; Andreas Henn, Neckargemünd, both of Germany

[73] Assignee: Heidelberger Druckmaschinen Aktiengesellschaft, Heidelberg, Germany

[21] Appl. No.: 09/274,502

[22] Filed: Mar. 23, 1999

[30]  Foreign Application Priority Data

Mar. 23, 1998 [DE] Germany ............... 198 12 593

[51] Int. Cl.$^7$ ................................... G01N 21/86
[52] U.S. Cl. ................ 250/559.31; 250/559.27
[58] Field of Search ............. 250/559.27, 559.29, 250/559.31, 222.2, 559.4; 356/375, 381, 387

[56] References Cited

U.S. PATENT DOCUMENTS

| | | | |
|---|---|---|---|
| 3,902,713 | 9/1975 | Von Iumann et al. ............ | 271/154 |
| 5,033,731 | 7/1991 | Looney ............................ | 271/176 |
| 5,457,312 | 10/1995 | Mansour ......................... | 250/222.2 |
| 5,847,405 | 12/1998 | Acquaviva et al. ............. | 250/559.36 |

FOREIGN PATENT DOCUMENTS

| | | | |
|---|---|---|---|
| 1 089 329 | 9/1960 | Germany . | |
| 56-161244 | 12/1981 | Japan ............... | B65H 7/14 |
| 11-314800 | 11/1999 | Japan ............... | B65H 7/00 |

*Primary Examiner*—Georgia Epps
*Assistant Examiner*—Saeed Seyrafi
*Attorney, Agent, or Firm*—Herbert L. Lerner; Laurence A. Greenberg; Werner H. Stemer

[57]  ABSTRACT

A method for detecting the position of stacked flat material wherein at least one light beam is directed onto a side of a pile of the flat material, is reflected therefrom and is evaluated as a measure of the position, includes directing the at least one light beam not only onto the side of the flat material pile, but also onto a region above a top edge of the pile, and utilizing regions with reflection and without reflection from the pile side for determining the position of the top edge of the pile; and a device for performing the foregoing method.

29 Claims, 3 Drawing Sheets

METHOD AND DEVICE FOR DETECTING THE POSITION OF STACKED MATERIAL

BACKGROUND OF THE INVENTION

FIELD OF THE INVENTION

The invention relates to a method for detecting the position of stacked flat material, in particular of a paper pile on a feeder of a printing machine, wherein at least one light beam is directed onto the side of the pile, is reflected therefrom and evaluated as a measure of the position.

The invention also relates to a device for performing the method, having a spacing sensor, with at least one light source and at least one receiver for the reflected light, and an evaluation device.

In the processing of paper sheets, and in particular in the feeder of printing machines, but also in the further processing of printed sheets, or in other cases of processing stacked material such as cardboard, the position of the stack or pile has to be detected. This is necessary in order to allow automatic processing, in particular, in order to remove sheets from the top surface of the pile and to feed those sheets to a printing, cutting, binding or other machine. For this purpose, it is necessary for both the lateral alignment and the vertical alignment of the pile to be detected. With regard to the lateral alignment, it is usually sufficient to detect the position of the side that extends parallel to the transport path of the material. Vertical alignment is necessary for gripping the uppermost stacked material by an appropriate device.

In the case of printing machines, vertical alignment is particularly important for the feeder pile because the suction head for removing the uppermost sheet and an underblowing device for blowing beneath the sheet have to be adjusted to the pile height. At the feeder of a printing machine, lateral alignment of the removed sheet at side lays can take place usually only in a small region. The transfer to the first gripper bar must, however, take place with extreme precision. Heretofore, it has been customary, for detecting the position of the pile, to provide separate sensors for the side and height detection, for which mostly ultrasonic sensors have been used.

The published German Patent Document DE 41 29 702 C2 discloses a method and a device for pile-side detection, the pile side being detected with the aid of a light beam reflected thereon, and the position of the pile side being determined in accordance with the trianguation principle. In this regard, however, a sensor is used only for detecting the pile side and not the top edge of the pile. A second sensor would have to be provided for this purpose, but this is complex and expensive.

SUMMARY OF THE INVENTION

It is accordingly an object of the invention to provide a method and a device for detecting the position of stacked material of the type mentioned in the introduction hereto wherein both the pile side and the top edge of the pile are measured in a contact-free manner by a single sensor.

With the foregoing and other objects in view, there is provided, in accordance with one aspect of the invention, a method for detecting the position of stacked flat material, wherein at least one light beam is directed onto a side of a pile of the flat material, is reflected therefrom and is evaluated as a measure of the position, which comprises directing the at least one light beam not only onto the side of the flat material pile, but also onto a region above a top edge of the pile, and utilizing regions with reflection and without reflection from the pile side for determining the position of the top edge of the pile.

In accordance with another mode, the method of the invention includes providing a curtain of light formed of parallel light beams.

In accordance with a further mode, the method of the invention includes displacing a light beam in parallel for scanning a scanning region.

In accordance with an added mode, the method of the invention includes displacing a light beam for scanning an angular region.

In accordance with an additional mode, the method of the invention includes detecting the position of the pile side in accordance with the triangulation principle.

In accordance with yet another mode, the method of the invention includes determining the position of the pile side by the intensity of the reflected light.

In accordance with yet a further mode, the method of the invention includes detecting the disposition of the pile side at least in a top region thereof so as to bring the top pile surface into a desired horizontal position thereof by displacing the pile.

In accordance with yet an added mode, the method of the invention includes providing the at least one light beam as a laser beam.

In accordance with yet an additional mode, the method of the invention includes eliminating a measuring range with unclear signals for the purposes of evaluation.

In accordance with still another mode, the method of the invention includes determining the position of the pile by averaging, at least in a sub-region of the pile side.

In accordance with still a further mode, the method of the invention includes, in the region of the top edge of the pile, determining the position of the top edge thereof by a point of inflection of a curve.

In accordance with still an added mode, the method of the invention includes performing the operation of detecting the position of the pile only in at least one given angular region of a machine for processing the flat material.

In accordance with still an additional mode, the method of the invention includes selecting an angular region of the machine in which the top surface of the pile is at rest.

In accordance with another mode, the method of the invention includes, during a signal evaluation, performing a weighted evaluation of the signal profile.

In accordance with a further mode, the method of the invention includes performing the signal evaluation by fuzzy logic.

In accordance with another aspect of the invention, there is provided a device for performing a method of detecting the position of stacked flat material, comprising a spacing sensor with at least one light source and at least one receiver for reflected light, and an evaluation device, the spacing sensor being arranged so that the at least one light beam is directed both onto the side of a pile of the stacked flat material and onto a region above a top edge of the pile, the evaluation device being set up for determining the position of the top edge of the pile by way of regions with reflection and without reflection.

In accordance with an added feature of the invention, a curtain of light is transmittable by the light source, and the receiver is set up for receiving the reflected curtain of light.

In accordance with an additional feature of the invention, a light beam is displaceable in parallel in a scanning region by the spacing sensor.

In accordance with yet another feature of the invention, a light beam is movable in an angular region by the spacing sensor.

In accordance with yet a further feature of the invention, the light source, the receiver and the pile side form a triangle from which the evaluation device is able to determine the position of the pile side in accordance with the triangulation principle.

In accordance with yet an added feature of the invention, the evaluation device is able to determine the spacing of the pile side, and the position of the pile, from the intensity of the reflected light.

In accordance with yet an additional feature of the invention, the spacing sensor and the evaluation device are constructed for detecting the disposition of the pile side at least in the top region of the latter and converting it into a signal for the displacement of the pile by a drive, so that the top pile surface is bringable into a desired horizontal position thereof.

In accordance with still another feature of the invention, the light source is able to emit at least one laser beam.

In accordance with still a further feature of the invention, the evaluation device is constructed so that a measuring range with unclear signals may be eliminated for the purposes of the evaluation.

In accordance with still an added feature of the invention, optical fibers are arranged between the light source and the emission of the light by the spacing sensor.

In accordance with still an additional feature of the invention, optical fibers are arranged between the receiver of the reflected light and the evaluation unit.

In accordance with another feature of the invention, the device includes a CCD array for converting the received reflected light into electric signals for the evaluation.

In accordance with a concomitant mode or feature of the invention, the stacked flat material, the position of which is being detected, is a paper sheet pile at the feeder of a printing machine.

An advantage of the invention is that a very precise measurement is made using just one sensor, the measurement being much more accurate than by using ultrasound. The use of just a single sensor reduces complexity and requires less installation space.

One mode of the method of the invention calls for the use of a curtain of light having parallel light beams. With respect to the device, provision is made for the light source to transmit a curtain of light, and the receiver to be set up for receiving the reflected curtain of light. In this regard, the light source may be a row of points of light and the receiver may be a row of light-receiving elements such as photocells or photodiodes.

Further possibilities with regard to the method of the invention are that a light beam is displaceable in parallel and thus is able to scan a scanning region, or that a light beam is able to scan an angular region. With regard to the device of the invention, scanning spacing sensors may then be provided. In this regard, it is possible for the spacing sensor to displace a light beam in parallel in a scanning region, or for the spacing sensor to move a light beam in an angular region.

The position of the pile side may be determined in various ways. With regard to the method of the invention, provision may be made for the position of the pile side to be detected by employing the so-called triangulation principle. A further possibility is that the position of the pile side is determinable by the intensity of the reflected light. With regard to the device of the invention, it is proposed that the light source, the receiver and the pile side form a triangle from which the evaluation device determines the position of the pile side, i.e., the aforementioned triangulation principle. The other possibility is that the evaluation device be constructed so that it determines the distance of the pile side, and thus the position of the paper pile, from the intensity of the reflected light.

An expedient further development of the method of the invention provides that the disposition or formation of the pile side be detected at least in the top region of the latter so that, by displacing the pile, the top pile surface is bringable into the desired or nominal horizontal position thereof. The device of the invention, for this purpose, provides that the spacing sensor and the evaluation device be constructed that they detect the disposition or formation of the pile side at least in the top region of the latter, and convert this into a signal for the displacement of the pile by a drive, so that the top pile surface is brought into the desired horizontal position thereof. The advantage of these developments is the possibility of compensating for a skewed position of the pile or a rippling of the pile side. In this regard, it is possible to set the desired position of the top pile surface very precisely. In the case of a feeder of a printing machine, this avoids the situation wherein a pile that is not located in a precise manner causes a machine stoppage because of an excessively large correction range for the feeder.

For accurate and fault-free measurement, it is proposed that the at least one light beam be a laser beam. The device thus provides a corresponding light source.

During the detection of the pile, there may be regions with unclear measurement signals. This is the case, in particular, when a material such as a paper sheet is removed from the top pile surface. In the feeder of a printing machine, this is effected by a suction head, that grips the uppermost sheet, and a blowing device, that blows beneath the sheet. Because a light beam falling on such a sheet that is just being removed does not produce a clear reflection, the result is an unclear measurement signal, which should be eliminated in order to avoid falsification of the measurement result for the purposes of the evaluation. As to the detection device according to the invention, the evaluation device thereof is constructed correspondingly so that it eliminates such unclear measurement signals.

Further modes of the method relate to the evaluation of the measurement results, which can be performed in various ways by various algorithms. Provision may be made, for example, at least in a sub-region of the pile side, for the position of the paper pile to be determined by averaging. This is expedient, for the operation of detecting the pile side, because the edges of the flat material, for example, in the case of paper sheets, may result in slightly altered reflections, due to which the measured value fluctuates within a given range. It is possible to compensate for these fluctuations by averaging. In this case, it is possible to provide this averaging only in a sub-region of the pile side, for example, in the top region of the latter. It is also possible for this averaging to be performed only in a given range of fluctuation, so that, although the differences in reflection are compensated for, it is nevertheless possible to detect a skewed position or rippling of the pile side. Also, with regard to the operation of detecting the top pile edge, it is possible to provide error-eliminating algorithms; for example, it is possible, in the region of the top pile edge, for the position of the latter to be determined by the point of inflection of a curve. This is expedient because the top pile edge, rather than being represented by a clear horizontal line in the measurement result, is always represented by a curve, which deviates from the horizontal to a given extent.

The operation of detecting the position of the pile need not be performed on a continuous basis; it is sufficient if it is performed in at least one given angular region of a machine, in particular of a printing machine. It is also possible to perform a number of measurements in various angular regions of the machine. It is expedient, in particular, if an angular region of the machine in which the top pile surface is at rest is selected. This is the case, for example, when no material is being removed from the pile, and the pile is not being readjusted. Thus, in the case of a sheet-printing machine, a sheet is always removed from the pile following a full revolution of the printing machine, i.e., after 360° have passed. The measurement may thus be carried out once per revolution in order to correct the top pile side before the next sheet is removed.

With the evaluation, it is also possible for a weighted evaluation of the signal profile to be performed, in order to eliminate, for example, regions which often do not contain any clear measured value. For the signal evaluation, it is possible to use any strategy, as required, with fuzzification and a corresponding formulation of fuzzy control algorithms for controlling the position of the side edge of the pile. Such strategies are possible because the information contents of the signals which are produced have a very great depth.

There are various embodiments of the device of the invention. For example, optical fibers make it possible for the light source and the evaluation device to be arranged at a location remote from the measuring location. Provision may be made for the optical fibers to be arranged both between the light source and the emission of the light by the spacing sensor, and between the receiver of the reflected light and the evaluation unit.

Provision may be made, for the evaluation, that the reflected light be converted by a CCD array into electric signals for the evaluation.

Other features which are considered as characteristic for the invention are set forth in the appended claims.

Although the invention is illustrated and described herein as embodied in a method and a device for detecting the position of stacked material, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

DESCRIPTION OF THE PREFERRED EMBODIMENTS

Figure 1:
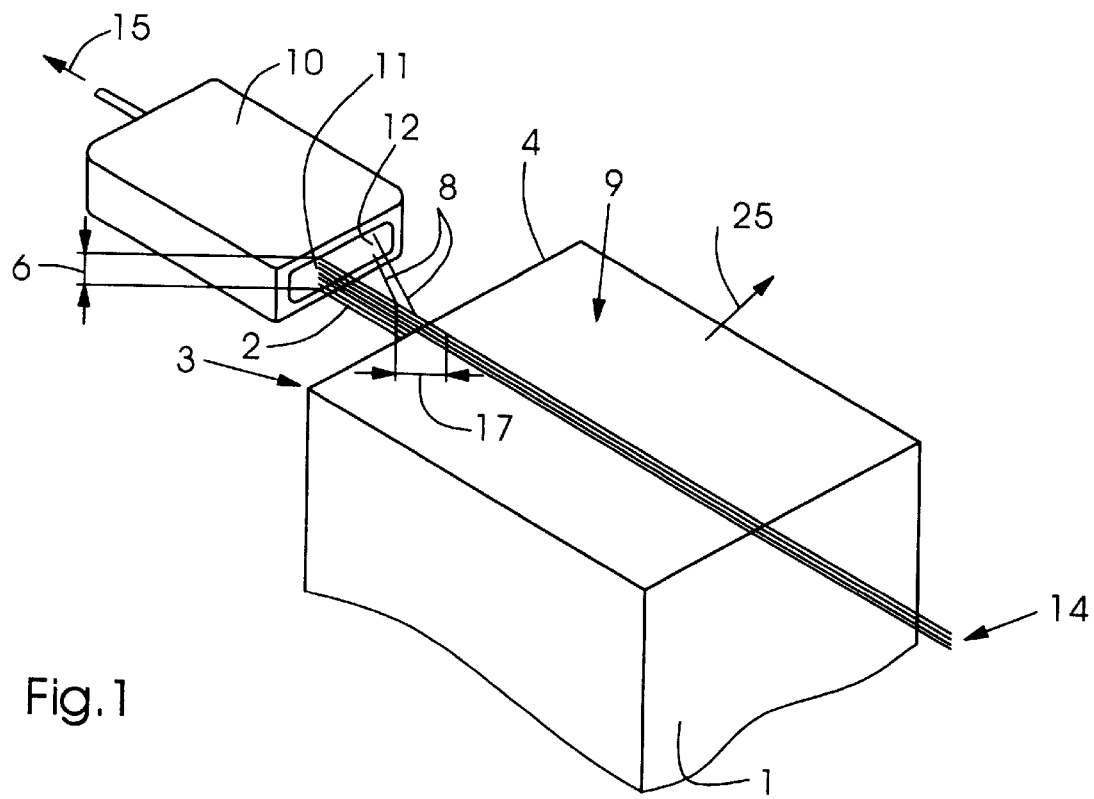
FIG. 1 is a diagrammatic perspective view of a first exemplary embodiment of the device for detecting the position of stacked material according to the invention, having a parallel scanning spacing sensor.

Referring now to the drawings and, first, particularly to FIG. 1 thereof, there is shown therein a first exemplary embodiment of the device for detecting the position of stacked material according to the invention, having a spacing sensor 10 that scans in parallel. The spacing sensor 10 directs a light beam 2, within a scanning region 6, onto a pile side 3 and a region above the top edge 4 of a pile, for example, a paper pile 1. The pile side 3 is the side that extends parallel to a sheet conveying direction represented by the arrow 25. The light beam 2 emitted by a light source 11 is reflected on the pile side 3 and received again by a receiver 12 of the spacing sensor 10. In this regard, the light source 11, the receiver 12 and that part of the pile side 3 that sends back the light as reflected light 8 form a triangle. From this triangle, it is possible to determine, within a measuring range 16 (note FIG. 2), the distance of the pile 1 from the spacing sensor 10 using the triangulation principle. The position of the top edge 4 of the pile 1, and thus of the top pile surface 9, can be determined by the fact that the region 13 with reflection and the region 14 without reflection are evaluated by the evaluation device. The arrow 15 indicates the signal transmission to the evaluation device.

Figure 2:
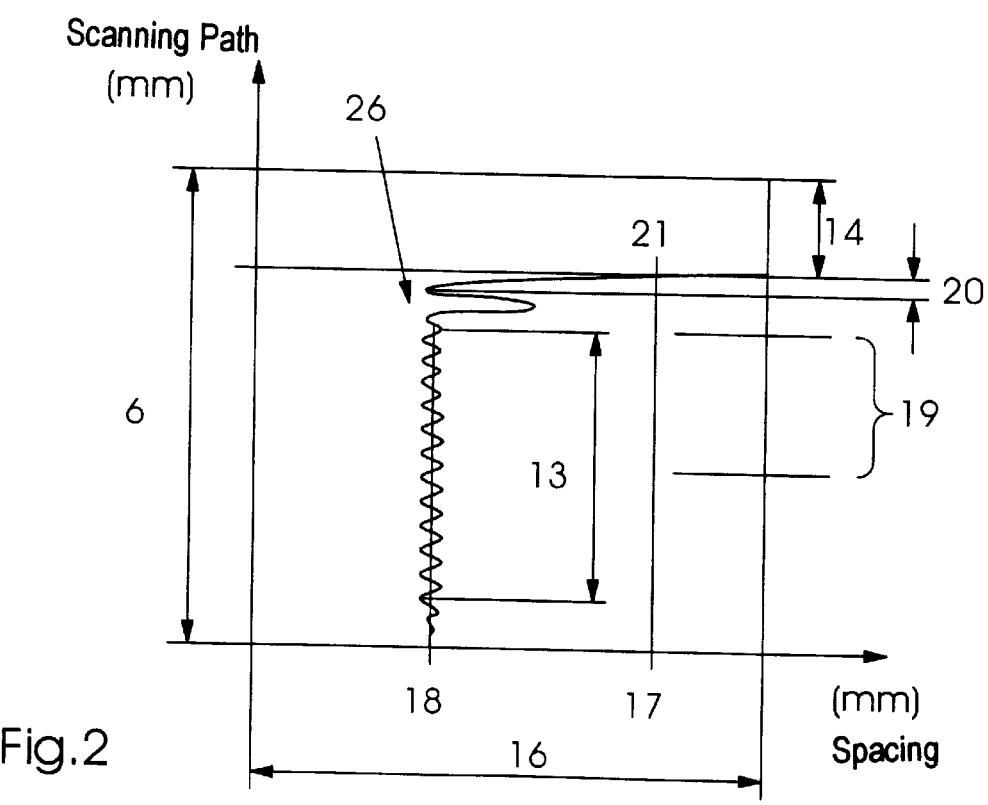
FIG. 2 is a plot diagram for a measurement curve achieved by the device of FIG. 1.

FIG. 2 shows the attained measurement curve. The scanning path with the scanning region 6 is plotted as the ordinate, and the spaced distance or spacing of the pile 1 from the spacing sensor 10 with the measuring range 16 thereof is plotted as the abscissa. In this case, the voltage determined by the measurement is a measure of the spacings. A typical scanning region is approximately 10 mm. The vertical curve region with the fluctuations gives the position 18 of the pile side 3. These fluctuations are caused by the edges, for example, of the paper sheets. It is expedient to eliminate these by averaging in order to be able to determine a relatively precise position 18 of the pile side 3. It is also possible to perform this averaging just in a sub-region of the pile side 3, for example, the sub-region 19. For the alignment of the pile 1, the formation in the uppermost region of the pile side 3 is usually decisive.

The position of the top edge 4 of the pile 1, and thus also of the top pile surface 9, is given by the transition from the region 13 with reflection to the region 14 without reflection. This transition is usually a region 20, because the measurement does not produce a precisely horizontal measurement-curve profile. There are various possibilities for determining the position 17 of the top edge 4 of the pile 1 from the curve profile; for example, the point of inflection of the curve 21 can be used for this purpose. However, other algorithms are also conceivable for the purpose of calculating the position of the top edge 4 of the pile 1.

There may be unclear signals 26 in certain measuring ranges. This is the case, for example, when a sheet is removed from the top surface 9 of the pile 1. Such an unclear measuring range 26 can be eliminated by the evaluation device.

Figure 3:
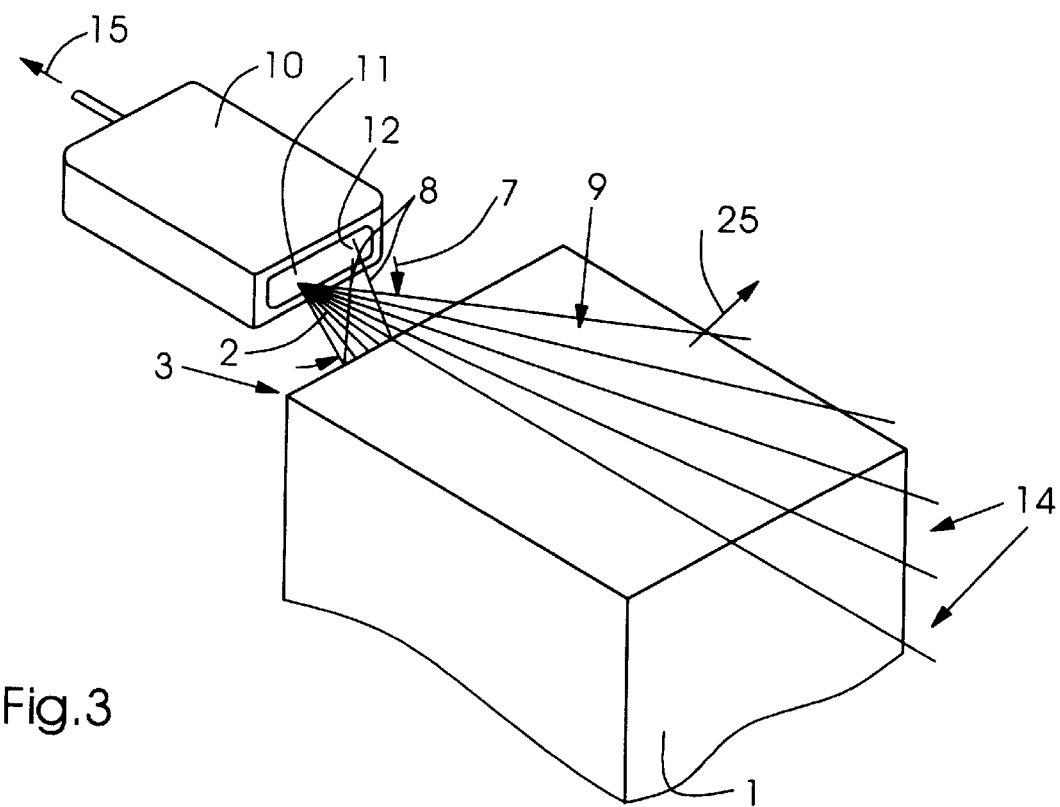
FIG. 3 is a view like that of FIG. 1 of a second exemplary embodiment of the detection device according to the invention, having a spacing sensor that deflects a light beam in an angular region.

FIG. 3 shows an exemplary embodiment with a spacing sensor 10 that deflects a light beam 2 in an angular region 7. Here too, as described for FIG. 1, an evaluation can be performed by employing the triangulation principle. Due to the angular position of the reflected light 8, it is also possible for the evaluation device to calculate the position of the top edge 4 of the pile 1. Otherwise the functions correspond to those for FIGS. 1 and 2; all that is required is for the various angular positions to be converted correspondingly in the evaluation.

Figure 4:
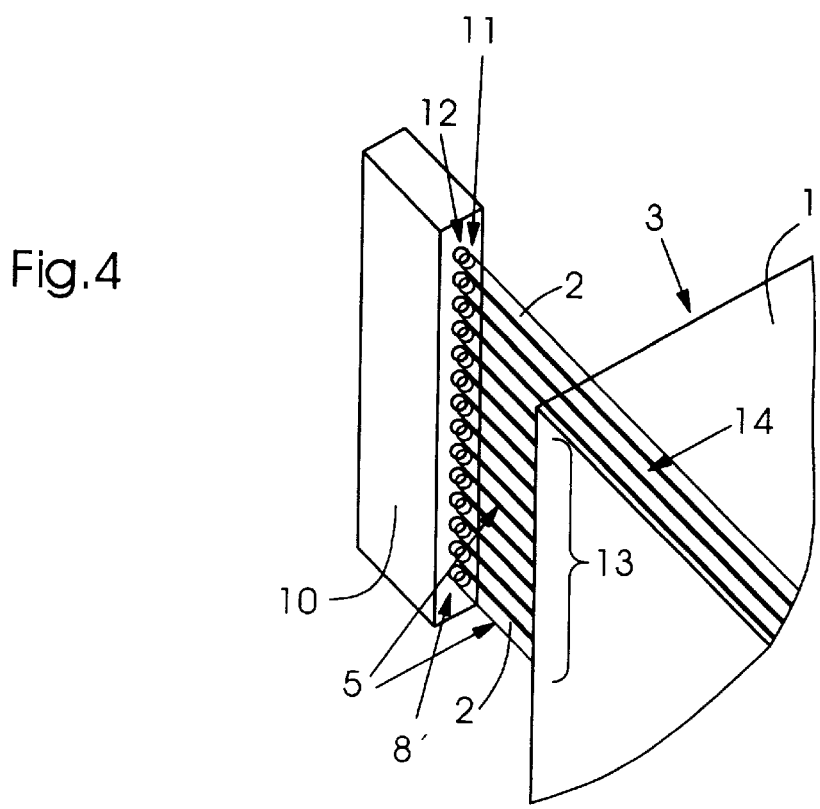
FIG. 4 is a perspective view of a third exemplary embodiment of the detection device according to the invention, having a curtain of light.

FIG. 4 shows an exemplary embodiment of the invention with a curtain of light 5. In this case, a series of light sources 11 are provided which emit the curtain of light in the direction of the pile side 3. The light is reflected in the region of the pile side 3 and received by a receiver 12 as a reflected curtain of light 8'. It is possible here for the light source 11 and the receiver 12 to be arranged directly beside one another. In contrast with the aforementioned triangulation principle, in this case, the intensity of the reflected curtain of light 8' is used as a measure of the distance or spacing between the spacing sensor 10 and the pile side 3.

Otherwise, the attained measurement curve and the evaluation correspond to those described for FIGS. 1 and 2.

Figure 5:
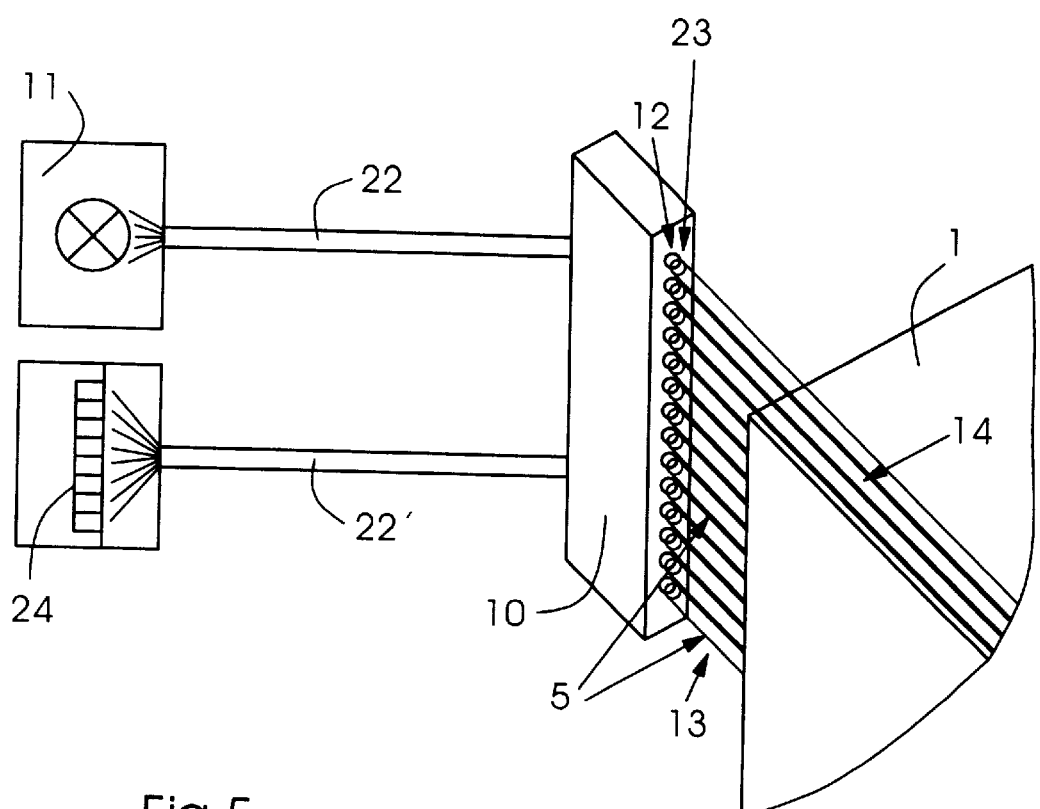
FIG. 5 is a view of the detection device according to the invention similar to that of FIG. 4 showing an exemplary embodiment wherein transmission is effected by optical fibers.

FIG. 5 shows an exemplary embodiment of the invention with transmission by optical fibers 22 and 22'. The advantage of this embodiment is that the spacing sensor 10 can be kept very small in structural terms and that the light source 11 and the evaluation unit may be arranged at a different location of the machine. In contrast with the exemplary embodiment of FIG. 4, the light from the light source 11 is directed to the spacing sensor 10 via the optical fibers 22. At the spacing sensor 10, the emission 23 of the light takes place at the end of the optical fibers or by a corresponding optical system. Conversely, the light is passed on from the receiver 12 to the evaluation unit by optical fibers 22'. The evaluation unit may be equipped, for example, with a CCD array 24.

The curtain of light may be produced in various ways; it is possible for a given light source to be converted into parallel beams by an optical system or for a series of laser diodes to be provided.

We claim:

1. A method for detecting the position of stacked flat material, wherein at least one light beam is directed onto a side of a pile of the flat material, is reflected therefrom and is evaluated as a measure of the position, which comprises directing the at least one light beam not only onto the side of the flat material pile, but also onto a region above a top edge of the pile, and utilizing regions with reflection and without reflection from the pile side for determining the position of the top edge of the pile.

2. The method according to claim 1, which includes providing a curtain of light formed of parallel light beams.

3. The method according to claim 1, which includes displacing a light beam in parallel for scanning a scanning region.

4. The method according to claim 1, which includes displacing a light beam for scanning an angular region.

5. The method according to claim 1, which includes detecting the position of the pile side in accordance with the triangulation principle.

6. The method according to claim 1, which includes determining the position of the pile side by the intensity of the reflected light.

7. The method according to claim 1, which includes detecting the disposition of the pile side at least in a top region thereof so as to bring the top pile surface into a desired horizontal position thereof by displacing the pile.

8. The method according to claim 1, which includes providing the at least one light beam as a laser beam.

9. The method according to claim 1, which includes eliminating a measuring range with unclear signals for the purposes of evaluation.

10. The method according to claim 1, which includes determining the position of the pile by averaging, at least in a sub-region of the pile side.

11. The method according to claim 1, which includes, in the region of the top edge of the pile, determining the position of the top edge thereof by the point of inflection of the curve.

12. The method according to claim 1, which includes performing the operation of detecting the position of the pile only in at least one given angular region of a machine for processing the flat material.

13. The method according to claim 12, which includes selecting an angular region of the machine in which the top surface of the pile is at rest.

14. The method according to claim 1, which includes, during a signal evaluation, performing a weighted evaluation of the signal profile.

15. The method according to claim 14, which includes performing the signal evaluation by fuzzy logic.

16. The method according to claim 1, wherein the stacked flat material, the position of which is being detected, is a paper sheet pile at the feeder of a printing machine.

17. A device for performing a method of detecting the position of stacked flat material, comprising a spacing sensor with at least one light source and at least one receiver for reflected light, and an evaluation device, said spacing sensor being arranged so that the at least one light beam is directed both onto the side of a pile of the stacked flat material and onto a region above a top edge of the pile, said evaluation device being set up for determining the position of the top edge of the pile by way of regions with reflection and without reflection.

18. The device according to claim 17, wherein a curtain of light is transmittable by said light source, and said receiver is set up for receiving the reflected curtain of light.

19. The device according to claim 17, wherein a light beam is displaceable in parallel in a scanning region by said spacing sensor.

20. The device according to claim 17, wherein a light beam is movable in an angular region by said spacing sensor.

21. The device according to claim 17, wherein said light source, said receiver and the pile side form a triangle from which said evaluation device is able to determine the position of the pile side in accordance with the triangulation principle.

22. The device according to claim 17, wherein said evaluation device is able to determine the spacing of the pile side, and the position of the pile, from the intensity of the reflected light.

23. The device according to claim 17, wherein said spacing sensor and said evaluation device are constructed for detecting the disposition of the pile side at least in the top region of the latter and converting it into a signal for the displacement of the pile by a drive, so that the top pile surface is bringable into a desired horizontal position thereof.

24. The device according to claim 17, wherein said light source is able to emit at least one laser beam.

25. The device according to claim 17, wherein said evaluation device is constructed so that a measuring range with unclear signals may be eliminated for the purposes of the evaluation.

26. The device according to claim 17, wherein optical fibers are arranged between said light source and the emission of the light by said spacing sensor.

27. The device according to claim 17, wherein optical fibers are arranged between said receiver of the reflected light and said evaluation unit.

28. The device according to claim 17, including a CCD array for converting the received reflected light into electric signals for the evaluation.

29. The device according to claim 17, wherein the stacked flat material, the position of which is being detected, is a paper sheet pile at the feeder of a printing machine.

* * * * *